United States Patent
Lo et al.

(10) Patent No.: US 10,978,723 B2
(45) Date of Patent: Apr. 13, 2021

(54) FUEL CELL SECONDARY POWER AND THERMAL MANAGEMENT SYSTEMS

(71) Applicant: HONEYWELL INTERNATIONAL INC., Morris Plains, NJ (US)

(72) Inventors: Charles Lo, Peoria, AZ (US); Dacong Weng, Rancho Palos Verdes, CA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 286 days.

(21) Appl. No.: 16/122,256

(22) Filed: Sep. 5, 2018

(65) Prior Publication Data
US 2020/0075971 A1 Mar. 5, 2020

(51) Int. Cl.
| | |
|---|---|
| *B64D 41/00* | (2006.01) |
| *H01M 8/04007* | (2016.01) |
| *H01M 8/0258* | (2016.01) |
| *H01M 8/04111* | (2016.01) |
| *H01M 8/04223* | (2016.01) |
| *H01M 8/04701* | (2016.01) |
| *H01M 8/0662* | (2016.01) |
| *H01M 8/1018* | (2016.01) |

(52) U.S. Cl.
CPC ........ *H01M 8/04074* (2013.01); *B64D 41/00* (2013.01); *H01M 8/0258* (2013.01); *H01M 8/04111* (2013.01); *H01M 8/04231* (2013.01); *H01M 8/04708* (2013.01); *H01M 8/0662* (2013.01); *B64D 2041/005* (2013.01); *H01M 2008/1095* (2013.01); *H01M 2250/20* (2013.01)

(58) Field of Classification Search
CPC ............. B64D 2041/005; B64D 41/00; H01M 8/04111; H01M 8/04708
USPC ........................................................... 244/58
See application file for complete search history.

(56) References Cited

U.S. PATENT DOCUMENTS

| | | | |
|---|---|---|---|
| 6,641,084 B1 * | 11/2003 | Huber .................... | B64D 41/00 244/48 |
| 7,380,749 B2 | 6/2008 | Fucke et al. | |
| 2004/0241514 A1 * | 12/2004 | Tsuji ................. | H01M 8/04014 429/435 |
| 2006/0237583 A1 | 10/2006 | Fucke et al. | |

(Continued)

FOREIGN PATENT DOCUMENTS

| | | |
|---|---|---|
| DE | 102016009968 A1 | 2/2018 |
| EP | 1630099 A2 | 3/2006 |

(Continued)

*Primary Examiner* — Claude J Brown
(74) *Attorney, Agent, or Firm* — Lorenz & Kopf, LLP

(57) ABSTRACT

A fuel cell secondary power and thermal management system includes a compressor, a turbine, a first heat exchanger, a proton exchange membrane fuel cell, and a second heat exchanger. The first heat exchanger has first and second air flow circuits and transfers heat between the first and second air flow circuits. The proton exchange membrane fuel cell includes a cathode air flow circuit and an anode hydrogen flow circuit. The cathode air flow circuit receives air from the first air flow circuit. The second heat exchanger has a third and fourth air flow circuits and is configured to transfer heat between the third and fourth air flow circuits. The third air flow circuit receives air from the second air flow circuit outlet. The fourth air flow circuit receives the air discharged from the cathode air flow circuit and supplies air to the turbine.

20 Claims, 5 Drawing Sheets

(56) References Cited

U.S. PATENT DOCUMENTS

| | | | |
|---|---|---|---|
| 2007/0287046 A1* | 12/2007 | Koda | H01M 8/04097 |
| | | | 429/410 |
| 2008/0187789 A1 | 8/2008 | Ghezel-Ayagh | |
| 2011/0045370 A1* | 2/2011 | Westenberger | H01M 8/04014 |
| | | | 429/434 |
| 2011/0207023 A1* | 8/2011 | Becker | H01M 8/04111 |
| | | | 429/512 |
| 2013/0175805 A1* | 7/2013 | Berntsen | H01M 8/04111 |
| | | | 290/1 A |
| 2014/0216036 A1* | 8/2014 | Bozzolo | H01M 8/04111 |
| | | | 60/728 |
| 2014/0352309 A1* | 12/2014 | Kim | H01M 8/04111 |
| | | | 60/671 |
| 2015/0030947 A1* | 1/2015 | Saunders | H01M 8/0662 |
| | | | 429/415 |
| 2015/0353201 A1* | 12/2015 | Hagh | B64D 37/32 |
| | | | 244/135 R |
| 2017/0170494 A1 | 6/2017 | Lents et al. | |
| 2018/0261863 A1* | 9/2018 | Agnew | H01M 8/0243 |
| 2019/0088962 A1* | 3/2019 | Chikugo | F02C 9/18 |

FOREIGN PATENT DOCUMENTS

| | | | |
|---|---|---|---|
| EP | 1463135 B1 | 1/2013 | |
| EP | 2927130 A1 | 10/2015 | |

\* cited by examiner

FUEL CELL SECONDARY POWER AND THERMAL MANAGEMENT SYSTEMS

STATEMENT REGARDING FEDERALLY SPONSORED RESEARCH OR DEVELOPMENT

This invention was made with Government support under DTFACT-16-C-00037 awarded by the Federal Aviation Administration (FAA). The Government has certain rights in the invention.

TECHNICAL FIELD

The present invention generally relates to fuel cell systems, and more particularly relates to fuel cell secondary power and thermal management systems.

BACKGROUND

Many aircraft include a power and thermal management system (PTMS). As is generally known, a PTMS combines the functions of an auxiliary power unit (APU), an emergency power unit (EPU), the environmental control system (ECS), and the thermal management system (TMS) into one integrated system. Combining these functions into an integrated system has desirably led to reductions in weight, volume, and cost, while simultaneously improving reliability. Still, this system may exhibit certain drawbacks. For example, the APU is typically a gas turbine engine driven device. As such, it consumes fossil fuel and undesirably emits noise and pollutants into the atmosphere.

Fuel cells are being considered as an alternative to gas turbine engine driven APUs. Fuel cells operate relatively quietly and are more efficient and environmentally benign than gas turbine engines. One particular type of fuel cell under consideration is the proton exchange membrane (PEM) fuel cell (FC) (also referred to as the polymer electrolyte membrane (PEM) FC), which uses compressed hydrogen gas as a fuel, and oxygen from the atmosphere as an oxidant. Although the PEM FC has been adapted for use in passenger automobiles, the overall weight and size of the automobile implementations are prohibitive for implementation in commercial aircraft.

Hence, there is a need for a PEM FC system that can supplement, or potentially replace, the APU in an aircraft PTMS that is relatively lighter and relatively more efficient that currently known PEM FC systems. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a fuel cell secondary power and thermal management system includes a compressor, a turbine, a first heat exchanger, a proton exchange membrane fuel cell, and a second heat exchanger. The compressor is configured to draw in air and supply compressed air. The turbine is coupled to receive and discharge air, and is configured, upon receipt of the air, to supply a drive torque. The first heat exchanger has a first air flow circuit and a second air flow circuit and is configured to transfer heat between the first and second air flow circuits. The first air flow circuit has a first air flow circuit inlet and a first air flow circuit outlet, and the first air flow circuit inlet is coupled to receive the compressed air from the compressor. The second air flow circuit has a second air flow circuit inlet and a second air flow circuit outlet, and the second air flow circuit inlet is coupled to receive the air discharged from the turbine. The proton exchange membrane fuel cell includes a cathode air flow circuit and an anode hydrogen flow circuit. The cathode air flow circuit has a cathode air flow circuit inlet and a cathode air flow circuit outlet. The cathode air flow circuit is coupled to receive air from the first air flow circuit outlet via the cathode air flow circuit inlet, and discharges air out the cathode air flow circuit outlet. The second heat exchanger has a third air flow circuit and a fourth air flow circuit and is configured to transfer heat between the third and fourth air flow circuits. The third air flow circuit has a third air flow circuit inlet and a third air flow circuit outlet, and the third air flow circuit inlet is coupled to receive air from the second air flow circuit outlet. The fourth air flow circuit has a fourth air flow circuit inlet and a fourth air flow circuit outlet. The fourth air flow circuit inlet is coupled to receive the air discharged from the cathode air flow circuit outlet, and the fourth air flow circuit outlet is coupled to supply the air to the turbine.

In another embodiment, a fuel cell secondary power and thermal management system includes a motor-generator, a compressor, a turbine, a hydrogen gas source, a first heat exchanger, a proton exchange membrane fuel cell, and a second heat exchanger. The motor-generator is configured to be selectively operated in a motor mode, in which it converts electrical power into rotational torque, and in a generator mode, in which it converts rotational torque into electrical power. The compressor is coupled to the motor-generator and is configured to draw in air and supply compressed air. The turbine is coupled to the motor-generator and is further coupled to receive and discharge air. The turbine is configured, upon receipt of the air, to supply a drive torque to the motor-generator. The first heat exchanger has a first air flow circuit and a second air flow circuit and is configured to transfer heat between the first and second air flow circuits. The first air flow circuit has a first air flow circuit inlet and a first air flow circuit outlet, and the first air flow circuit inlet is coupled to receive the compressed air from the compressor. The second air flow circuit has a second air flow circuit inlet and a second air flow circuit outlet, and the second air flow circuit inlet is coupled to receive the air discharged from the turbine. The proton exchange membrane fuel cell includes a cathode air flow circuit and an anode hydrogen flow circuit. The anode hydrogen flow circuit has an anode hydrogen flow circuit inlet and an anode hydrogen flow circuit outlet. The anode hydrogen flow circuit is coupled to receive hydrogen from the hydrogen gas source via the anode hydrogen flow circuit inlet. The cathode air flow circuit has a cathode air flow circuit inlet and a cathode air flow circuit outlet. The cathode air flow circuit is coupled to receive air from the first air flow circuit outlet via the cathode air flow circuit inlet, and to discharge air out the cathode air flow circuit outlet. The second heat exchanger has a third air flow circuit and a fourth air flow circuit and is configured to transfer heat between the third and fourth air flow circuits. The third air flow circuit has a third air flow circuit inlet and a third air flow circuit outlet, and the third air flow circuit inlet is coupled to receive air from the second air flow circuit outlet. The fourth air flow circuit has a fourth air flow circuit inlet and a fourth air flow circuit outlet. The fourth air flow circuit inlet is coupled to receive the air discharged from the cathode air flow circuit outlet, and the fourth air flow circuit outlet is coupled to supply the air to the turbine.

In yet another embodiment, an aircraft includes an aircraft fuselage and a fuel cell secondary power and thermal management system disposed within the fuselage. The fuel cell secondary power and thermal management system a compressor, a turbine, a first heat exchanger, a proton exchange membrane fuel cell, and a second heat exchanger. The compressor is configured to draw in air and supply compressed air. The turbine is coupled to receive and discharge air, and is configured, upon receipt of the air, to supply a drive torque. The first heat exchanger has a first air flow circuit and a second air flow circuit and is configured to transfer heat between the first and second air flow circuits. The first air flow circuit has a first air flow circuit inlet and a first air flow circuit outlet, and the first air flow circuit inlet is coupled to receive the compressed air from the compressor. The second air flow circuit has a second air flow circuit inlet and a second air flow circuit outlet, and the second air flow circuit inlet is coupled to receive the air discharged from the turbine. The proton exchange membrane fuel cell includes a cathode air flow circuit and an anode hydrogen flow circuit. The cathode air flow circuit has a cathode air flow circuit inlet and a cathode air flow circuit outlet. The cathode air flow circuit is coupled to receive air from the first air flow circuit outlet via the cathode air flow circuit inlet, and discharges air out the cathode air flow circuit outlet. The second heat exchanger has a third air flow circuit and a fourth air flow circuit and is configured to transfer heat between the third and fourth air flow circuits. The third air flow circuit has a third air flow circuit inlet and a third air flow circuit outlet, and the third air flow circuit inlet is coupled to receive air from the second air flow circuit outlet. The fourth air flow circuit has a fourth air flow circuit inlet and a fourth air flow circuit outlet. The fourth air flow circuit inlet is coupled to receive the air discharged from the cathode air flow circuit outlet, and the fourth air flow circuit outlet is coupled to supply the air to the turbine.

Furthermore, other desirable features and characteristics of the fuel cell secondary power and thermal management system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
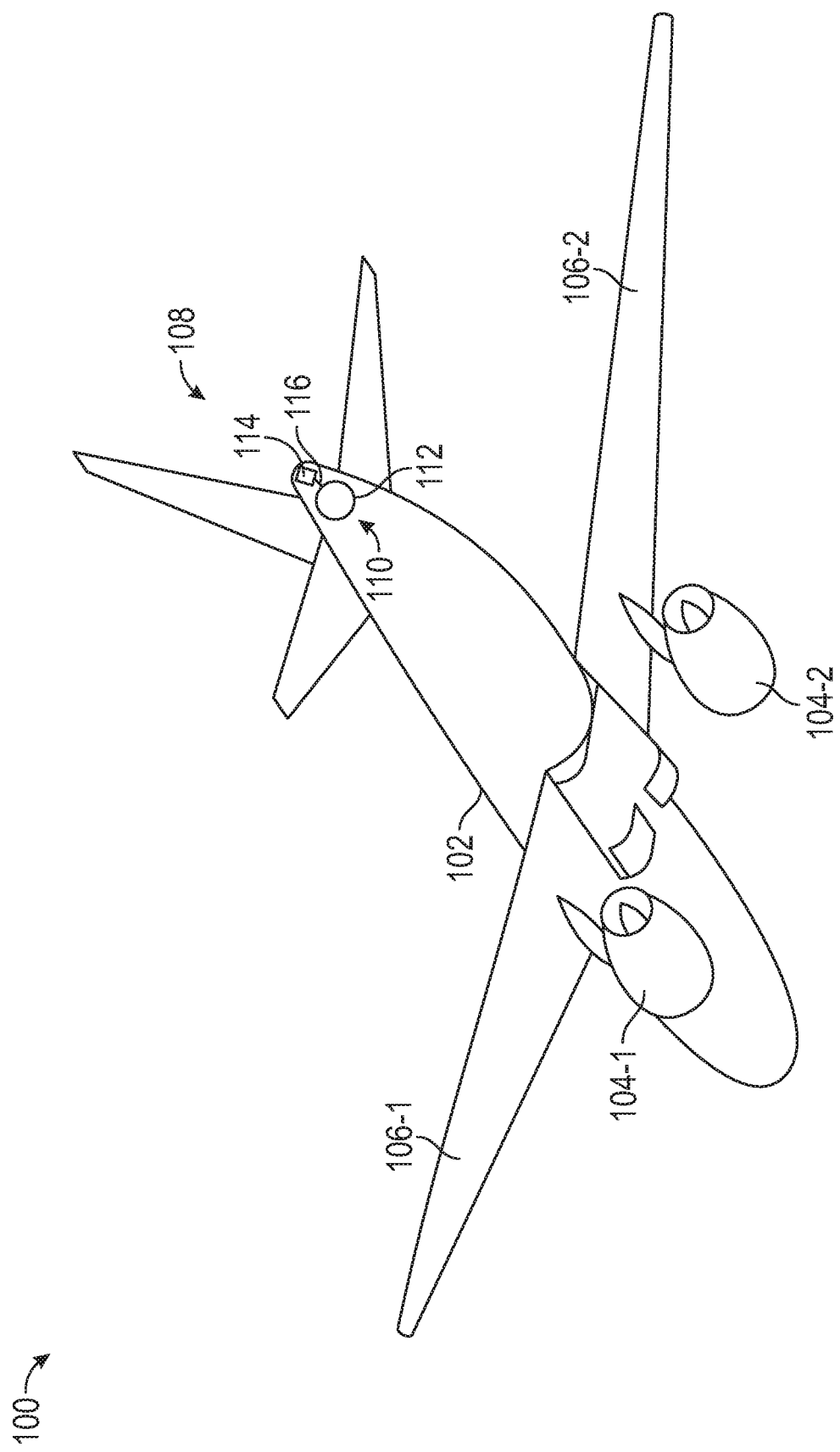
FIG. 1 depicts an outline of an aircraft including a fuel cell secondary power and thermal management system.

Referring to FIG. 1, an outline of an aircraft 100 is depicted. The aircraft 100 includes a fuselage 102, a plurality of propulsion engines 104 (104-1, 104-2), a pair of wings 106 (106-1, 106-2), and an empennage 108. As FIG. 1 further depicts, the aircraft 100 additionally includes a secondary power and thermal management system 110. In the depicted embodiment, the secondary power and thermal management system 110 includes a hydrogen gas source 112 and a fuel cell secondary power and thermal management systems 114.

Figure 2:
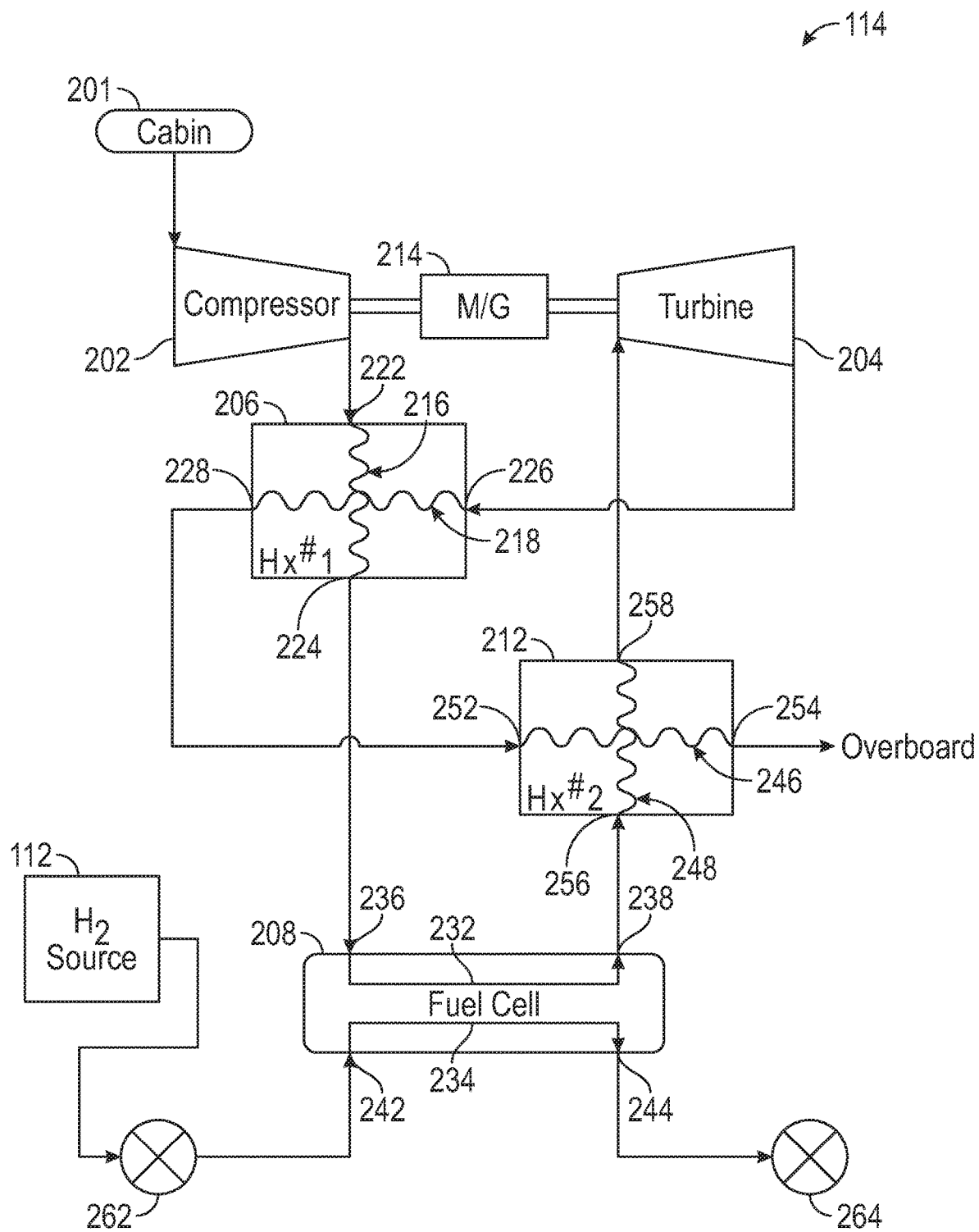
FIG. 2 depicts a schematic representation of one embodiment of a fuel cell secondary power and thermal management system.

The hydrogen gas source 112 may be implemented using any one of numerous known hydrogen gas sources including, for example, a pressurized hydrogen tank or bottle, or a suitable hydrogen gas generator. Regardless of how it is specifically implemented, the hydrogen gas source 112 is in fluid communication with the fuel cell secondary power and thermal management system 114, via suitable plumbing 116, and supplies hydrogen gas to the system 114. One embodiment of a fuel cell secondary power and thermal management system 114 is depicted in FIG. 2, and with reference thereto will now be described.

The depicted fuel cell secondary power and thermal management system 114 includes a compressor 202, a turbine 204, a first heat exchanger 206, a proton exchange membrane (PEM) fuel cell (FC) 208, and a second heat exchanger 212. As FIG. 2 also depicts, the system 114 may also include an electric machine 214. Before proceeding further, it is noted that a proton exchange membrane FC is also referred to as a polymer electrolyte membrane FC. For consistency, the term "proton exchange membrane" is used throughout the remainder of the description and in the claims. It is to be understood, however, that whenever "proton exchange membrane" is used, it also encompasses "polymer electrolyte membrane."

The compressor 202 is coupled to receive a drive torque and is configured, upon receipt of the drive torque, to rotate, draw in ambient air, and supply compressed air. In the context of the aircraft 100, the ambient air that is drawn in is cabin air from the aircraft cabin 201. As is generally known, because the received air is being compressed, the temperature of the compressed air that is subsequently discharged from the compressor 202 is higher than the temperature of the ambient air. The compressor 202 may be implemented using any one of numerous suitable compressor types. Some non-limiting examples including any one of numerous centrifugal compressors, axial compressors, or axi-centrifugal compressors.

The turbine 204 is coupled to receive and discharge air. The source of the air it receives is discussed further below. The turbine 204 is configured, upon receipt of the air, to rotate and supply a drive torque. As is generally known, because energy is being extracted from the received air to generate the drive torque, the temperature of the air that is subsequently discharged from the turbine 204 is lower than the temperature of the received air. The drive torque from the turbine 204 may be used to directly drive the compressor 202 or, as in the depicted embodiment, to drive the electric machine 214. The turbine 204 may be implemented using any one of numerous suitable turbine types. Some non-limiting examples including any one of numerous axial, radial, and axi-centrifugal turbines.

The first heat exchanger 206 includes a first air flow circuit 216 and a second air flow circuit 218. The first heat exchanger 206 is configured to transfer heat between the first and second air flow circuits 216, 218. The first air flow circuit 216 has a first air flow circuit inlet 222 and a first air flow circuit outlet 224, and the second air flow circuit 218 has a second air flow circuit inlet 226 and a second air flow circuit outlet 228. The first air flow circuit inlet 222 is coupled to receive the compressed air that is discharged from the compressor 202, and the second air flow circuit inlet 226 is coupled to receive the air that is discharged from the turbine 204. Because the temperature of the air discharged from the compressor 202 is higher than the temperature of the air discharged from the turbine 204, heat is transferred from the compressed air to the turbine discharge air, thereby cooling the compressed air and heating the turbine discharge air. The cooled compressed air is supplied to the proton exchange membrane fuel cell 208, and the heated turbine discharge air is supplied to the second heat exchanger 212. It will be appreciated that the first heat exchanger 206 may be implemented using any one of numerous known types of heat exchangers. Some non-limiting examples include shell and tube heat exchanger, plate and shell (or frame) heat exchangers, and plate fin heat exchangers, just to name a few.

Figure 3:
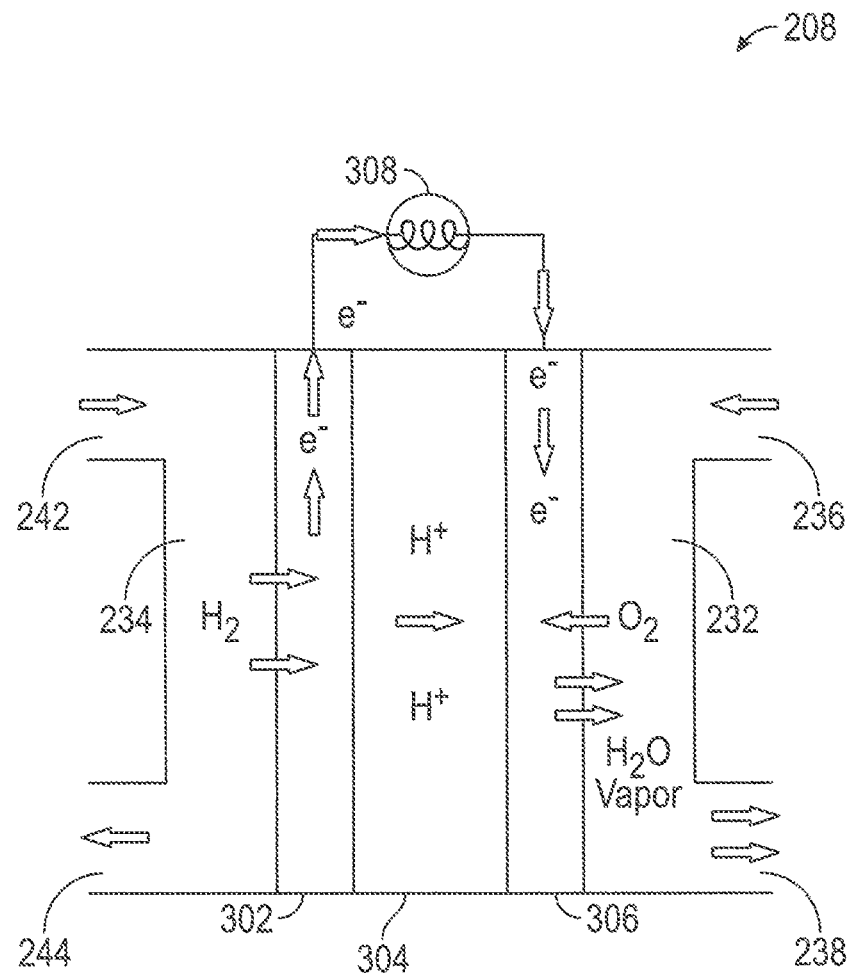
FIG. 3 depicts a simplified cross section view of one embodiment of a proton exchange membrane fuel cell.

The proton exchange membrane fuel cell 208 includes a cathode air flow circuit 232 and an anode hydrogen flow circuit 234. The cathode air flow circuit 232 has a cathode air flow circuit inlet 236 and a cathode air flow circuit outlet 238, and the anode hydrogen flow circuit 234 has an anode hydrogen flow circuit inlet 242 and an anode hydrogen flow circuit outlet 244. The cathode air flow circuit 232 is coupled to receive air from the first air flow circuit outlet 224, via the cathode air flow circuit inlet 236, and discharges air out of the cathode air flow circuit outlet 238. The anode hydrogen flow circuit 234 is coupled to receive hydrogen from the hydrogen gas source 112, via the anode hydrogen flow circuit inlet 242. The proton exchange membrane fuel cell 208 uses the hydrogen supplied from the hydrogen gas source 112 and the cooled compressed air supplied from the first heat exchanger to generate electricity. For completeness, a simplified cross section view of one embodiment of a proton exchange membrane fuel cell 208 is depicted in FIG. 3, and will now be described.

The proton exchange membrane fuel cell 208, as is generally known, includes an anode 302, an electrolyte membrane 304, and a cathode 306. The anode 302 comprises a catalyst that causes the hydrogen to oxidize, separating it into protons and electrons. The electrolyte membrane 304 is disposed between an anode 302 and the cathode 306, and functions as an electrolyte that conducts only the protons. Thus, the protons pass through the membrane 304 to the cathode 306 while the electrons from the anode 302 flow through an electrical load 308, via an external circuit, to the cathode 306. The cathode 306 also comprises a catalyst that combines the protons, electrons, and oxygen from the air to generate water vapor that is discharged with the air and supplied to the second heat exchanger 212. Electrical power is generated during this electrochemical process.

Returning to FIG. 2, the second heat exchanger 212 includes a third air flow circuit 246 and a fourth air flow circuit 248. The second heat exchanger 212 is configured to transfer heat between the third and fourth air flow circuits 246, 248. The third air flow circuit 246 has a third air flow circuit inlet 252 and a third air flow circuit outlet 254, and the fourth air flow circuit 248 has a fourth air flow circuit inlet 256 and a fourth air flow circuit outlet 258. The third air flow circuit inlet 252 is coupled to receive air from the second air flow circuit outlet 228, and the fourth air flow circuit inlet 256 is coupled to receive the air (and small amount of water vapor) discharged from the cathode air flow circuit outlet 238. Because the temperature of the air discharged from the second air flow circuit outlet 228 is higher than the temperature of the air discharged from the cathode air flow circuit outlet 238, heat is transferred from the heated turbine discharge air to the fuel cell discharge air, thereby cooling the turbine discharge air and heating the fuel cell discharge air. The cooled turbine discharge air is discharged overboard via the third air flow circuit outlet 254. The heated fuel cell discharge air is supplied to the turbine 204 via the fourth air flow circuit outlet 258. It will be appreciated that the second heat exchanger 212 may be implemented using any one of numerous known types of heat exchangers. Some non-limiting examples include shell and tube heat exchanger, plate and shell heat exchangers, and plate fin heat exchangers, just to name a few.

As was noted above, the system 114 may also include an electric machine 214. The electric machine 214, when included, is coupled to both the compressor 202 and the turbine 204. In the depicted embodiment, the electric machine 214 is implemented as a motor-generator that is configured to be selectively operated in either a motor mode or a generator mode. In the motor mode, the electric machine 214 acts as an electric motor and converts electrical power into rotational torque. In the generator mode, the electric machine 214 acts as a generator and converts rotational torque into electrical power. As may be appreciated, when the system 114 is operating at relatively lower altitudes, the electric machine 214 is preferably operated in the motor mode to thereby initially drive the compressor 202 (and the turbine 204). Thereafter, when the system 114 is operating at a relatively higher altitude, the electric machine 214 is preferably operated in the generator mode (and driven by the turbine 204) due to more mechanical power being produced by the turbine 204 than the compressor 202 can consume, to thereby generate and supply electrical power to non-illustrated electrical loads.

The depicted system 114 may additionally include at least a hydrogen supply valve 262 and a hydrogen purge valve 264. Both of these valves 262, 264 are disposed in the anode hydrogen flow circuit 234, and both are moveable between a closed position and an open position. The hydrogen supply valve 262 is disposed upstream of the anode hydrogen flow circuit inlet 242. When it is in its open position, hydrogen gas flows from the hydrogen gas source 112 to the anode hydrogen flow circuit inlet 242 for fuel cell operation, and when it is in its closed position, hydrogen gas does not flow from the hydrogen gas source 112 to the anode hydrogen flow circuit inlet 242. The hydrogen purge valve 264 is disposed downstream of the anode hydrogen flow circuit outlet 244. When it is in its open position, some of the hydrogen gas and impurities in the anode hydrogen flow circuit are purged from the anode 302. It will be appreciated that the system 114 may additionally include other control valves with functions not needed to implement or enable the instant invention.

The fuel cell secondary power and thermal management system 114 uses the compressor 202 to supply pressurized air to the cathode 306 of the proton exchange membrane fuel cell 208. Before the pressurized air is supplied to the cathode 306, it is cooled in the first heat exchanger 206 by relatively cool air that is discharged from the turbine 204. The relatively cool air that is discharged from the turbine 204 is heated in the first heat exchanger 206 by the relatively hot air that is discharged from the compressor 202. The heated turbine air that is discharged from the first heat exchanger 206 is then used in the second heat exchanger 212 to heat the air that is discharged from the cathode 306 of the proton exchange membrane fuel cell 208. This heated air is then supplied to the turbine 204. This cycle increases the overall efficiency of the fuel cell secondary power and thermal management system 114.

Figure 4:
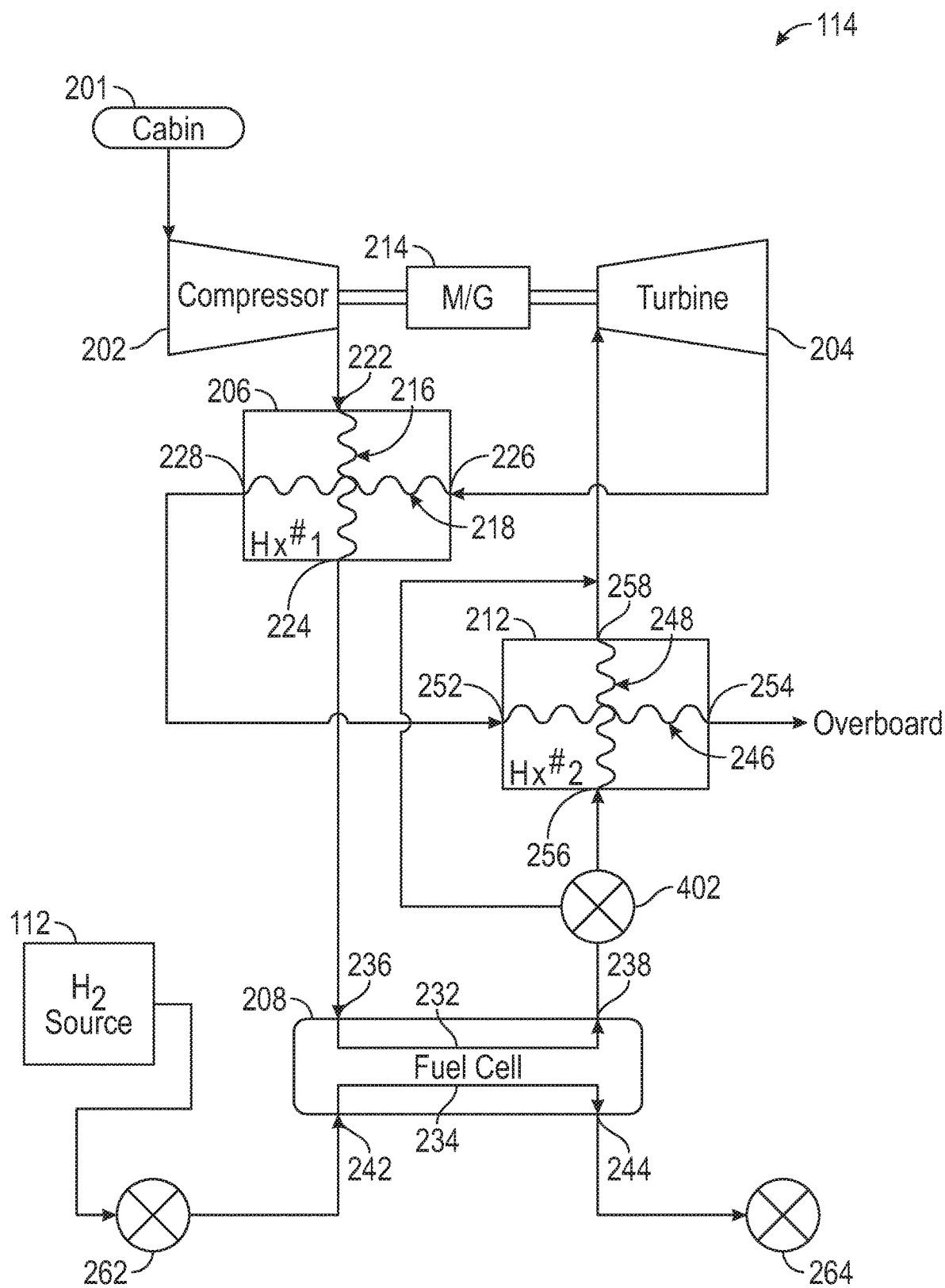
FIG. 4 depicts a schematic representation of a second embodiment of a fuel cell secondary power and thermal management system.

As may be appreciated, and as was described above, the heated air that is supplied to the turbine 204 cools at it expands through the turbine 204. In some instances, the temperature of the air that is discharged from the turbine 204 may not be sufficiently cool to reduce the temperature of the compressor discharge air. Thus, in some embodiments, such as the one depicted in FIG. 4, the fuel cell secondary power and thermal management system 114 may additionally include one or more valves 402. In the depicted embodiment, a single 3-way valve 402 is used, though different valve configurations and numbers may be used. The 3-way valve 402, when included, is disposed between the proton exchange membrane fuel cell 208 and the second heat exchanger 212, and more specifically between the cathode air flow circuit outlet 238 and the fourth air flow circuit inlet 256.

The 3-way valve 402 is moveable between a first position and a second position. In the first position, the cathode air flow circuit outlet 238 is in fluid communication with the fourth air flow circuit inlet 256, and the air discharged from the cathode 306 flows through the second heat exchanger 212. In the second position, the cathode air flow circuit outlet 238 is not in fluid communication with the fourth air flow circuit inlet 256, and the air discharged from the cathode 306 bypasses the second heat exchanger 212. It will be appreciated that, at least in some embodiments, the 3-way valve 402 may be moveable to a plurality of positions between the first and second positions to thereby control the amount of cathode discharge air that bypasses the second heat exchanger 212.

Figure 5:
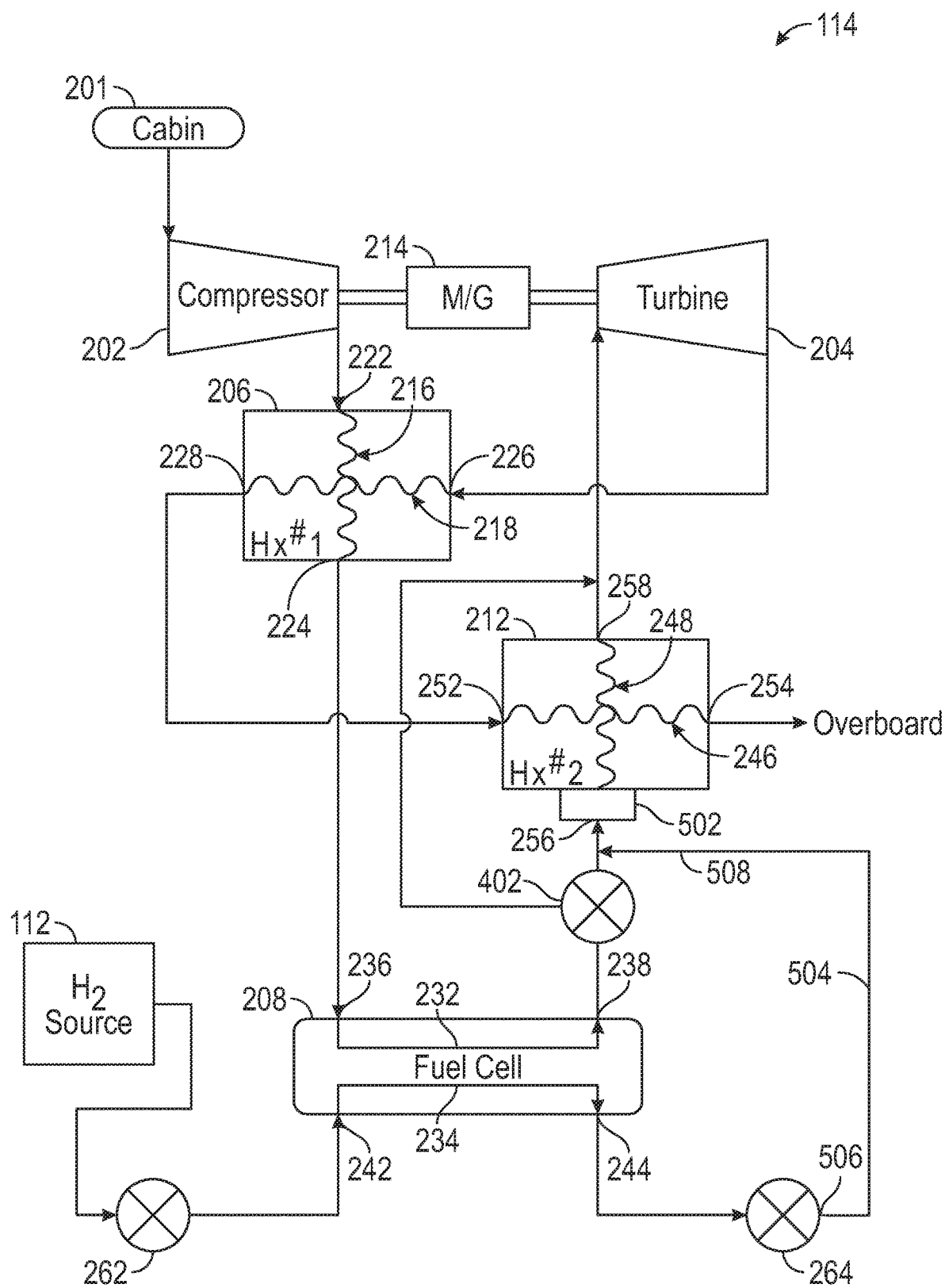
FIG. 5 depicts a schematic representation of another embodiment of a fuel cell secondary power and thermal management system.

In still another embodiment, which is depicted in FIG. 5, thermal energy may be recovered from the hydrogen that is purged from the fuel cell anode 302. In such embodiments, the second heat exchanger 212 at least partially comprises a catalyst, which may be implemented as an integrated or separate catalytic converter section 502, and the system 114 further includes a hydrogen purge flow circuit 504. The catalytic converter section 502 may implemented by disposing the catalyst on or in the fourth air flow circuit 248.

The hydrogen purge flow circuit 504 includes a hydrogen purge flow circuit inlet 506 and a hydrogen purge flow circuit outlet 508. The hydrogen purge flow circuit inlet 506 is in fluid communication with the hydrogen purge valve 264, and the hydrogen purge flow circuit outlet 508 is in fluid communication with the fourth air flow circuit inlet 256. Thus, when the hydrogen purge valve 264 is in the open position, the anode hydrogen flow circuit outlet 204 is in fluid communication with the fourth air flow circuit inlet 256, via the hydrogen purge flow circuit 504, and air from the cathode air flow circuit 232 reacts with the hydrogen that is purged from the anode 302 in the catalytic converter section 502 in the second heat exchanger 212.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fuel cell secondary power and thermal management system, comprising:
a compressor configured to draw in air and supply compressed air;
a turbine coupled to receive and discharge air, the turbine configured, upon receipt of the air, to supply a drive torque;
a first heat exchanger having a first air flow circuit and a second air flow circuit and configured to transfer heat between the first and second air flow circuits, the first air flow circuit having a first air flow circuit inlet and a first air flow circuit outlet, the first air flow circuit inlet coupled to receive the compressed air from the compressor, the second air flow circuit having a second air flow circuit inlet and a second air flow circuit outlet, the second air flow circuit inlet coupled to receive the air discharged from the turbine;
a proton exchange membrane fuel cell including a cathode air flow circuit and an anode hydrogen flow circuit, the cathode air flow circuit having a cathode air flow circuit inlet and a cathode air flow circuit outlet, the cathode air flow circuit coupled to receive air from the first air flow circuit outlet via the cathode air flow circuit inlet, and discharge air out the cathode air flow circuit outlet; and
a second heat exchanger having a third air flow circuit and a fourth air flow circuit and configured to transfer heat between the third and fourth air flow circuits, the third air flow circuit having a third air flow circuit inlet and a third air flow circuit outlet, the third air flow circuit inlet coupled to receive air from the second air flow circuit outlet, the fourth air flow circuit having a fourth air flow circuit inlet and a fourth air flow circuit outlet, the fourth air flow circuit inlet coupled to receive the air discharged from the cathode air flow circuit outlet, the fourth air flow circuit outlet coupled to supply the air to the turbine.

2. The system of claim 1, further comprising:
an electric machine coupled to the compressor and the turbine and configured to at least drive the compressor.

3. The system of claim 2, wherein the electric machine is a motor-generator that is configured to be selectively operated in a motor mode, in which it converts electrical power into rotational torque, and in a generator mode, in which it converts rotational torque into electrical power.

4. The system of claim 1, further comprising:
a valve disposed between the proton exchange membrane fuel cell and the second heat exchanger, the valve moveable between a first position, in which the cathode air flow circuit outlet is in fluid communication with the fourth air flow circuit inlet, and a second position, in which the cathode air flow circuit outlet is not in fluid communication with the fourth air flow circuit inlet.

5. The system of claim 1, further comprising a hydrogen gas source in fluid communication with the anode hydrogen flow circuit inlet.

6. The system of claim 5, wherein:
the anode hydrogen flow circuit includes an anode hydrogen flow circuit inlet and an anode hydrogen flow circuit outlet; and
the anode hydrogen flow circuit is coupled to receive hydrogen from the hydrogen gas source via the anode hydrogen flow circuit inlet.

7. The system of claim 6, further comprising:
a hydrogen purge valve disposed in the anode hydrogen flow circuit downstream of the anode hydrogen flow circuit outlet, the hydrogen purge valve moveable between a closed position and an open position.

8. The system of claim 7, wherein the second heat exchanger at least partially comprises a catalyst to form a catalytic converter section.

9. The system of claim 8, further comprising:
a hydrogen purge flow circuit, the hydrogen purge flow circuit having a hydrogen purge flow circuit inlet and a hydrogen purge flow circuit outlet, the hydrogen flow circuit inlet in fluid communication with the hydrogen purge valve, the hydrogen flow circuit outlet in fluid communication with the fourth air flow circuit inlet,
wherein, when the hydrogen purge valve is in the open position, the anode hydrogen flow circuit outlet is in fluid communication with the fourth air flow circuit inlet, via the hydrogen purge flow circuit.

10. A fuel cell secondary power and thermal management system, comprising:
motor-generator configured to be selectively operated in a motor mode, in which it converts electrical power into rotational torque, and in a generator mode, in which it converts rotational torque into electrical power;
a compressor coupled to the motor-generator and configured to draw in air and supply compressed air;
a turbine coupled to the motor-generator and further coupled to receive and discharge air, the turbine configured, upon receipt of the air, to supply a drive torque to the motor-generator;
a hydrogen gas source;
a first heat exchanger having a first air flow circuit and a second air flow circuit and configured to transfer heat between the first and second air flow circuits, the first air flow circuit having a first air flow circuit inlet and a first air flow circuit outlet, the first air flow circuit inlet coupled to receive the compressed air from the compressor, the second air flow circuit having a second air flow circuit inlet and a second air flow circuit outlet, the second air flow circuit inlet coupled to receive the air discharged from the turbine;
a proton exchange membrane fuel cell including a cathode air flow circuit and an anode hydrogen flow circuit, the anode hydrogen flow circuit having an anode hydrogen flow circuit inlet and an anode hydrogen flow circuit outlet, the anode hydrogen flow circuit is coupled to receive hydrogen from the hydrogen gas source via the anode hydrogen flow circuit inlet, the cathode air flow circuit having a cathode air flow circuit inlet and a cathode air flow circuit outlet, the cathode air flow circuit coupled to receive air from the first air flow circuit outlet via the cathode air flow circuit inlet, and discharge air out the cathode air flow circuit outlet; and
a second heat exchanger having a third air flow circuit and a fourth air flow circuit and configured to transfer heat between the third and fourth air flow circuits, the third air flow circuit having a third air flow circuit inlet and a third air flow circuit outlet, the third air flow circuit inlet coupled to receive air from the second air flow circuit outlet, the fourth air flow circuit having a fourth air flow circuit inlet and a fourth air flow circuit outlet, the fourth air flow circuit inlet coupled to receive the air discharged from the cathode air flow circuit outlet, the fourth air flow circuit outlet coupled to supply the air to the turbine.

11. The system of claim 10, further comprising:
a valve disposed between the proton exchange membrane fuel cell and the second heat exchanger, the valve moveable between a first position, in which the cathode air flow circuit outlet is in fluid communication with the fourth air flow circuit inlet, and a second position, in which the cathode air flow circuit outlet is not in fluid communication with the fourth air flow circuit inlet.

12. The system of claim 11, further comprising:
a hydrogen purge valve disposed in the anode hydrogen flow circuit downstream of the anode hydrogen flow circuit outlet, the hydrogen purge valve moveable between a closed position and an open position.

13. The system of claim 12, wherein the second heat exchanger at least partially comprises a catalyst to form a catalytic converter section.

14. The system of claim 13, further comprising:
a hydrogen purge flow circuit, the hydrogen purge flow circuit having a hydrogen purge flow circuit inlet and a hydrogen purge flow circuit outlet, the hydrogen flow circuit inlet in fluid communication with the hydrogen purge valve, the hydrogen flow circuit outlet in fluid communication with the fourth air flow circuit inlet,
wherein, when the hydrogen purge valve is in the open position, the anode hydrogen flow circuit outlet is in fluid communication with the fourth air flow circuit inlet, via the hydrogen purge flow circuit.

15. An aircraft, comprising:
an aircraft fuselage;
a fuel cell secondary power and thermal management system disposed within the fuselage, the fuel cell secondary power and thermal management system comprising:
a compressor configured to draw in air and supply compressed air;

a turbine coupled to receive and discharge air, the turbine configured, upon receipt of the air, to supply a drive torque;

a first heat exchanger having a first air flow circuit and a second air flow circuit and configured to transfer heat between the first and second air flow circuits, the first air flow circuit having a first air flow circuit inlet and a first air flow circuit outlet, the first air flow circuit inlet coupled to receive the compressed air from the compressor, the second air flow circuit having a second air flow circuit inlet and a second air flow circuit outlet, the second air flow circuit inlet coupled to receive the air discharged from the turbine;

a proton exchange membrane fuel cell including a cathode air flow circuit and an anode hydrogen flow circuit, the cathode air flow circuit having a cathode air flow circuit inlet and a cathode air flow circuit outlet, the cathode air flow circuit coupled to receive air from the first air flow circuit outlet via the cathode air flow circuit inlet, and discharge air out the cathode air flow circuit outlet; and a second heat exchanger having a third air flow circuit and a fourth air flow circuit and configured to transfer heat between the third and fourth air flow circuits, the third air flow circuit having a third air flow circuit inlet and a third air flow circuit outlet, the third air flow circuit inlet coupled to receive air from the second air flow circuit outlet, the fourth air flow circuit having a fourth air flow circuit inlet and a fourth air flow circuit outlet, the fourth air flow circuit inlet coupled to receive the air discharged from the cathode air flow circuit outlet, the fourth air flow circuit outlet coupled to supply the air to the turbine.

16. The aircraft of claim 15, further comprising:
a motor-generator coupled to the compressor and the turbine and configured to be selectively operated in a motor mode, in which it converts electrical power into rotational torque, and in a generator mode, in which it converts rotational torque into electrical power.

17. The aircraft of claim 15, further comprising:
a valve disposed between the proton exchange membrane fuel cell and the second heat exchanger, the valve moveable between a first position, in which the cathode air flow circuit outlet is in fluid communication with the fourth air flow circuit inlet, and a second position, in which the cathode air flow circuit outlet is not in fluid communication with the fourth air flow circuit inlet.

18. The aircraft of claim 1, further comprising a hydrogen gas source in fluid communication with the anode hydrogen flow circuit inlet.

19. The aircraft of claim 18, wherein:
the anode hydrogen flow circuit includes an anode hydrogen flow circuit inlet and an anode hydrogen flow circuit outlet;
the anode hydrogen flow circuit is coupled to receive hydrogen from the hydrogen gas source via the anode hydrogen flow circuit inlet; and
the system further comprises a hydrogen purge valve disposed in the anode hydrogen flow circuit downstream of the anode hydrogen flow circuit outlet, the hydrogen purge valve moveable between a closed position and an open position.

20. The aircraft of claim 19, further comprising:
a hydrogen purge flow circuit, the hydrogen purge flow circuit having a hydrogen purge flow circuit inlet and a hydrogen purge flow circuit outlet, the hydrogen flow circuit inlet in fluid communication with the hydrogen purge valve, the hydrogen flow circuit outlet in fluid communication with the fourth air flow circuit inlet, wherein:
the second heat exchanger at least partially comprises a catalyst to form a catalytic converter section, and when the hydrogen purge valve is in the open position, the anode hydrogen flow circuit outlet is in fluid communication with the fourth air flow circuit inlet, via the hydrogen purge flow circuit.

* * * * *